INVENTOR.
Asa E. Roane
BY
ATTORNEY.

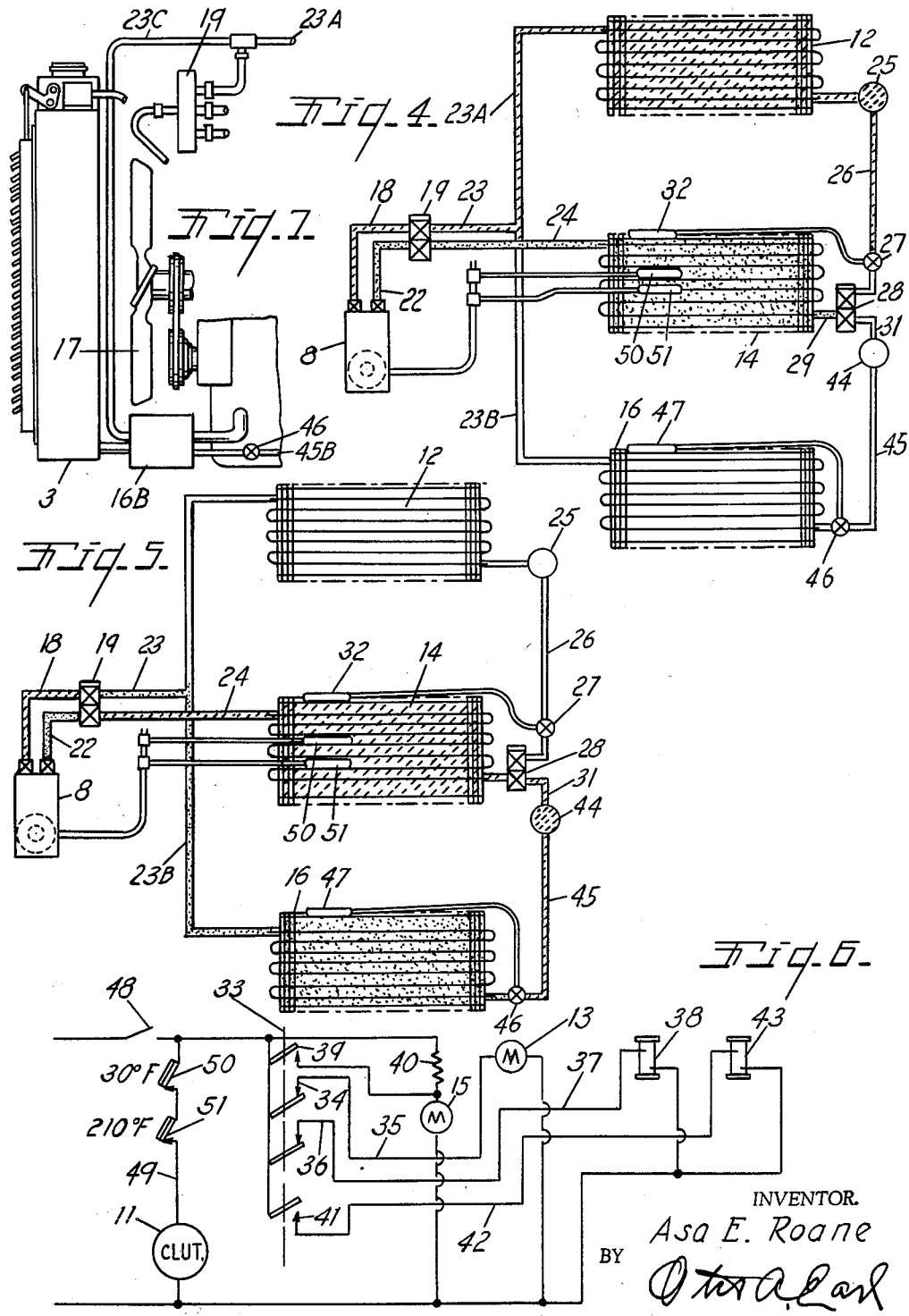

United States Patent Office 3,171,474
Patented Mar. 2, 1965

3,171,474
AUTOMOTIVE HEATING AND COOLING AIR
CONDITIONING SYSTEM
Asa E. Roane, Cadillac, Mich., assignor to Kysor
Industrial Corporation, Cadillac, Mich.
Filed Dec. 3, 1962, Ser. No. 241,742
5 Claims. (Cl. 165—43)

This invention relates to improvements in automotive heating and cooling air conditioning system. The principal objects of this invention are:

First, to provide a reversible heat pump and system that will either cool or heat an automobile or truck with a minimum of structure and be supplied with heat from the vehicle engine when used to heat the vehicle.

Second, to provide a reversible heat pump that receives heat at a controlled temperature from the internal combustion engine of a vehicle to heat the vehicle.

Third, to provide an air conditioning system for automotive vehicles that is reversible between heating and cooling conditions by introducing an expansion valve and heat absorbing heat exchanger in series between the air conditioning heat exchanger in the passenger compartment and the compressor in the heating adjustment of the system in place of a heat dissipating heat exchanger and expansion valve connected in the circuit from the compressor to the air conditioning exchanger.

Other objects and advantages of the invention will be apparent from a consideration of the following description and claims. The drawings, of which there are two sheets, illustrate a highly practical form of the air conditioning system.

FIG. 4 is a schematic diagram of the circulating system of the air conditioner in cooling condition to cool the cab of the vehicle.

FIG. 5 is a schematic diagram of the system adjusted to heat the cab of the vehicle.

FIG. 6 is a schematic wiring diagram of the electric control system for the air conditioner.

FIG. 7 is a fragmentary conventional view illustrating a modified form of the system with a direct fluid to fluid transfer of heat from the engine coolant to the refrigerant.

Figure 1:
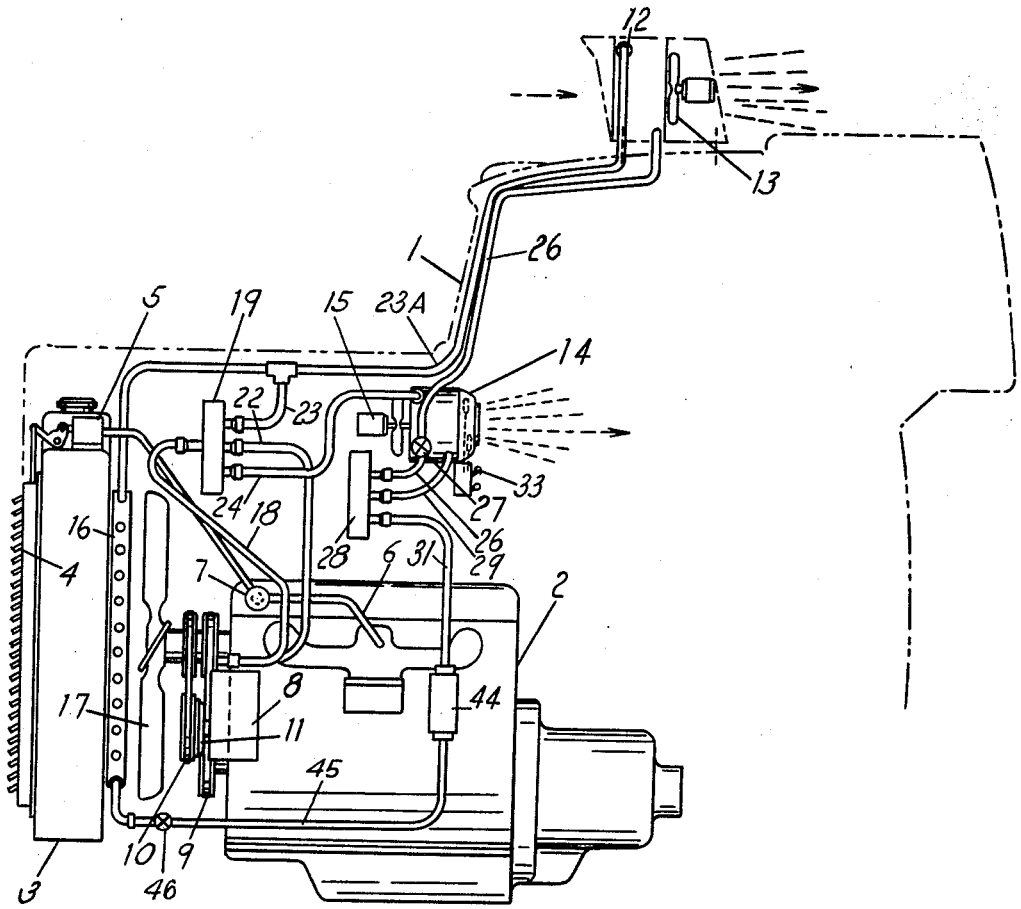
FIG. 1 is a fragmentary side elevational view of the system as mounted on the cab and engine of a motor truck, parts of the truck and engine being shown conventionally and in phantom outline.

The air conditioning system of the engine is designed primarily for regulating the temperature within the cab 1 or passenger compartment of a truck having an internal combustion engine 2 and an associated radiator 3. For maintaining most effective operating conditions of truck engines, the truck radiators are commonly provided with shutters 4 which are opened and closed by power mechanisms indicated conventionally at 5 by means of fluid pressure such as the subatmospheric pressure of the manifold sampled through the vacuum tube 6 and thermostatically regulated by thermostatic control valve 7 which senses the temperature in the cooling jacket of the engine to open and close the shutters as necessary to maintain a constant effective operating temperature in the engine and radiator. These elements are well known and so are not disclosed in greater detail.

The air conditioning system of the invention is driven by a compressor 8 mounted on the side of the engine and driven through the belts 9 and 10 from the engine. An electric clutch 11 is interposed between the belt 10 and the compressor to selectively start and stop the operation of the system. A first heat dissipating heat exchanger 12 in the form of a coil with connected heat dissipating fins is mounted on the roof of the cab and has a motor driven fan 13 associated therewith to effect air flow through the heat exchanger when the truck is not in motion. While the truck is in motion the normal air stream flowing around the cab is forced through the heat exchanger 12. A second heat exchanger 14 is positioned in the passenger compartment of the cab 1 or arranged to discharge into the compartment and a second motor driven fan 15 is provided for circulating air through the second heat exchanger. A third heat exchanger 16 in the form of a serpentine coil with heat exchange fins arranged across the turns of the coil is positioned directly behind the radiator 3 of the truck engine and ahead of the engine driven radiator fan 17 to be subject to the temperature of the radiator and the air which flows through the radiator when the shutters 4 are opened.

Figures 2, 3:
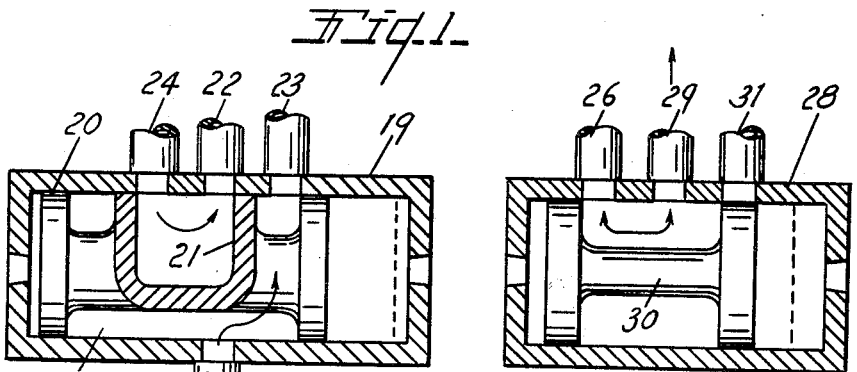
FIG. 2 is a fragmentary cross sectional view through a four way valve used in switching the system between heating and cooling conditions.
FIG. 3 is a fragmentary cross sectional view through a two way valve used in switching the system between heating and cooling conditions.

The connections for connecting and regulating the compressor and heat exchangers of the system are shown more clearly in FIGS. 2 to 5. The output or high pressure side of the compressor 8 is connected through the pipe 18 to a four-way valve 19 as is indicated conventionally in FIG. 2. The valve 19 has an internal sliding spool 20 with a first internal chamber 21 arranged to selectively connect central pipe or conduit 22 with either the pipe 23 or pipe 24. With the valve and system conditioned for cooling as appears in FIGS. 2 and 4 the output pipe 18 is connected through the exterior spool passage 124 with the pipe 23. One branch 23A of the pipe extends to the heat exchanger 12 and a receiver 25. As will be appreciated, hot gases from the compressor are condensed to a liquid and collected in the receiver 25. Liquid is conducted through the pipe 26 to a first thermostatic expansion valve 27 and from there through the two-way valve 28 to the inlet connection 29 to the second heat exchanger 14 positioned in the passenger compartment of the cab. The two-way valve 28 is an electrically actuated valve having a core 30 adapted to selectively connect the pipe 29 with either the pipe 26 or another pipe 31 to be described.

The valves 19 and 28 are electrically actuated in response to selective controls to be described and desirably are pilot pressure operated valves only indirectly associated with the controlling solenoids, but since valves of this type are common the details are not further illustrated.

The thermostatic expansion valve 27 is under the control of the temperature sensing bulb 32 positioned near the outlet end of the heat exchanger 14 and the output or suction side of the heat exchanger in the air conditioning or cooling condition of the system is returned through the pipe 24 and passage 21 in the four-way valve to the suction side 22 of the compressor. In this cooling or air conditioning arrangement of the system, it will be noted that the two-way valve 28 cuts off the pipe 31 to the heat exchanger 16 so this heat exchanger positioned behind the truck radiator remains inoperative.

The air conditioning system is converted from cooling or air conditioning condition to heating condition by actuating a switch control 33. With reference to FIG. 6 the switch control 33 opens a switch 34 to the conductor 35 thus deenergizing the air circulating motor 13 for circulating air through the cab top heat exchanger 12. It also opens a switch 36 deenergizing the wire 37 and the solenoid 38 which controls the four-way valve 19. Simultaneously a switch 39 is closed directly energizing the motor 15 to increase the speed of the motor. Previously the motor had been energized by the lower voltage through a dropping resistor 40 for slower speed operation during the cooling condition of the system. The fourth switch 41 is closed energizing the conductor 42 and the solenoid 43 of the three-way valve to shift the valve 28. In this arrangement or condition of the system as shown in FIG. 5, the output 18 from the compressor is directed through the passage 124 in the four-way valve to the pipe 24 oppositely through the heat exchanger 14. The pipe 29 which now becomes the outlet of the cab heat exchanger is connected through the three-way valve 28 to the pipe 31 and the pipe 26 is blocked off.

Hot gases from the compressor are thus passed through the heat exchanger and heat is transferred therefrom into the truck cab by air blown across the heat exchanger by the motor 15. The gases thus liquefied are collected in a receiver 44 and admitted through the pipe 45 to a second thermostatic expansion valve 46 positioned at the inlet end of the heat absorbing heat exchanger 16. The thermostatic expansion valve 46 is under the control of a temperature sensing bulb 47 positioned near the outlet of the heat exchanger 16. The heat exchanger 16 is connected through the pipe 23B to the previously described pipe 23 and the four-way valve 19 and delivers to the compressor 8 through the pipe 22 when the valve is adjusted to heating condition.

The on-off control switch 48 energizes the system for either condition of operation and the magnetic clutch 11 for operating the compressor is normally continuously energized through the circuit 49 but has thermostatically operated limit switches 50 and 51 connected in series therewith and positioned to sense the temperature in the cab heat exchanger 14. One switch 50 may open when the temperature falls below 30° to deenergize a cooling cycle while the other switch 51 may open at a predetermined high temperature for example, 210° to deenergize a heating cycle. During the heating condition or cycle of the system heat is introduced into the heat exchanger 16 at a relatively constant predetermined level or temperature from the radiator 3 and the compressor 8 and other elements of the system can be designed for more efficient operation at this temperature.

As an alternative for the heat exchanger 16 positioned in the airstream behind the radiator, a liquid to liquid heat exchanger 16B can be connected between the output of the radiator and the engine as in FIG. 7 with the refrigerant connections 45B and 23C connected in the same way in the air conditioning circuit as in FIGS. 4 and 5. In this way heat for the heating cycle is collected direct from the engine coolant fluid at a fairly constant temperature.

What is claimed as new is:

1. A reversible air conditioning system in an automotive vehicle having an engine, radiator, thermostatically controlled radiator shutter and passenger compartment comprising,
    a compressor connectable to said engine by an electrically actuated clutch,
    a first heat exchange coil positioned adjacent said radiator to be subject to air heated by the radiator,
    a second heat exchange coil positioned to be subject to air in the air stream of the vehicle,
    a first fan positioned to pass outside air through said second coil,
    a third heat exchange coil in said compartment,
    a second fan arranged to pass air through said third coil into said compartment, a two way valve, a four way valve,
    a pair of expansion valves,
    piping connecting said compressor, valves and coils in an air conditioning circuit from said compressor through said four way valve, second coil, one of said expansion valves, two way valve, third coil and four way valve to the compressor to the exclusion of said first coil and the other of said expansion valves,
    electric control means connected to reverse said two and four way valves to connect the elements in a circuit from said compressor through said four way valve to said third coil, said two way valve, the other of said expansion valves, said first coil and said four way valve to said compressor, a pair of thermostatic switches connected in series with said electrically actuated clutch and arranged to open respectively when the temperature in said third coil is about 30° F. and about 210° F.,
    and switches ganged with said control means connected to deenergize said first fan and energize said second fan at a maximum speed in the reverse position of said valves,
    said first fan being connected through a resistor to said control means for operation at reduced speed.

2. A reversible air conditioning system in an automotive vehicle having an engine, radiator, thermostatically controlled radiator shutter and passenger compartment comprising,
    a compressor connectable to said engine by an electrically actuated clutch,
    a first heat exchange coil positioned adjacent said radiator to be subject to air heated by the radiator,
    a second heat exchange coil positioned to be subject to air in the air stream of the vehicle,
    a first fan positioned to pass outside air through said second coil,
    a third heat exchange coil in said compartment,
    a second fan arranged to pass air through said third coil into said compartment, a two way valve, a four way valve,
    a pair of expansion valves,
    piping connecting said compressor, valves and coils in an air conditioning circuit from said compressor through said four way valve, second coil, one of said expansion valves, two way valve, third coil and four way valve to the compressor to the exclusion of said first coil and the other of said expansion valves,
    electric control means connected to reverse said two and four way valves to connect the elements in a circuit from said compressor through said four way valve to said third coil, said two way valve, the other of said expansion valves, said first coil and said four way valve to said compressor, a pair of thermostatic switches connected in series with said electrically actuated clutch and arranged to open respectively when the temperature in said third coil is a predetermined low below and a predetermined high above room temperature,
    and switches connected to deenergize said first fan and energize said second fan at a maximum speed in the reverse position of said valves.

3. A reversible air conditioning system for a vehicle having an engine with a radiator and a passenger compartment comprising,
    a first heat exchanger positioned to discharge air into said compartment,
    a second heat exchanger positioned to be subject to the temperature of air external to the vehicle,
    a third heat exchanger arranged to be subject to heat from said engine through said radiator,
    a compressor arranged to be driven by said engine,
    a four way valve connected to the suction side and pressure side of said compressor and adapted to reversibly connect said sides to first and second conduits,
    said first conduit having branches connected to the inlet side of said second heat exchanger and the outlet side of said third heat exchanger,
    said second conduit being directly connected to one side of said first heat exchanger,
    a two way valve having a connection to the other side of said first heat exchanger and adapted to alternatively connect said other side to a third or fourth conduit,
    said third conduit being connected to the outlet side of said second heat exchanger and having a thermostatically controlled expansion valve therein delivering to said two way valve and operative in response to temperature at said one side of said first heat exchanger, said fourth conduit being connected to the outlet side of said third heat exchanger and having a thermostatically controlled expansion valve therein delivering to said two way valve and operative in response to temperature in said third heat exchanger, and an electrically actuated clutch arranged to connect said compressor to said engine, and two thermostatic switches sensing the temperature in said first exchanger and opening one below a relatively low limit temperature and one above a relatively high limit temperature and electrically connected in series to actuate said clutch.

4. A reversible air conditioning system for a vehicle having an engine and a passenger compartment comprising, a first heat exchanger positioned to discharge air into said compartment, a second heat exchanger positioned to be subject to the temperature of air external to the vehicle, a third heat exchanger arranged to be subject to heat from said engine, a compressor arranged to be driven by said engine, a four way valve connected to the suction side and pressure side of said compressor and adapted to reversibly connect said sides to first and second conduits, said first conduit having branches connected to the inlet side of said second heat exchanger and the outlet side of said third heat exchanger, said second conduit being directly connected to one side of said first heat exchanger, a two way valve having a connection to the other side of said first heat exchanger and adapted to alternatively connect said other side to a third or fourth conduit, said third conduit being connected to the outlet side of said second heat exchanger and having a thermostatically controlled expansion valve therein delivering to said two way valve and operative in response to temperature of said first heat exchanger, said fourth conduit being connected to the outlet side of said third heat exchanger and having a thermostatically controlled expansion valve therein delivering to said two way valve and operative in response to temperature in said third heat exchanger, and an electrically actuated clutch arranged to connect said compressor to said engine, and two thermostatic switches sensing the temperature in said first exchanger and opening one below a relatively low limit temperature and one above a relatively high limit temperature and electrically connected in series to actuate said clutch.

5. A reversible air conditioning system for a vehicle having an engine and a passenger compartment comprising, a first heat exchanger positioned to discharge air into said compartment, a second heat exchanger positioned to be subject to the temperature of air external to the vehicle, a third heat exchanger arranged to be subject to heat from said engine, a compressor, a four way valve connected to the suction side and pressure side of said compressor and adapted to reversibly connect said sides to first and second conduits, said first conduit having branches connected to the inlet side of said second heat exchanger and the outlet side of said third heat exchanger, said second conduit being directly connected to one side of said first heat exchanger, a two way valve having a connection to the other side of said first heat exchanger and adapted to alternatively connect said other side to a third or fourth conduit, said third conduit being connected to the outlet side of said second heat exchanger and having a thermostatically controlled expansion valve therein delivering to said two way valve and operative in response to temperature of said first heat exchanger, said fourth conduit being connected to the outlet side of said third heat exchanger and having a thermostatically controlled expansion valve therein delivering to said two way valve and operative in response to temperature in said third heat exchanger.

References Cited by the Examiner
UNITED STATES PATENTS

| | | | |
|---|---|---|---|
| 2,201,765 | 5/40 | Euwer | 165—42 |
| 2,336,733 | 12/43 | Hull | 165—43 |
| 2,801,827 | 8/57 | Dolza | 165—43 |
| 2,806,358 | 9/57 | Jacobs | 165—43 X |

CHARLES SUKALO, Primary Examiner.

JAMES W. WESTHAVER, Examiner.